United States Patent [19]  [11] 4,054,162
Krieg et al.  [45] Oct. 18, 1977

[54] COLOR STABILIZED ACRYLONITRILE POLYMERS

[75] Inventors: Manfred Krieg, Darmstadt; Armin Meyer, Darmstadt-Eberstadt, both of Germany

[73] Assignee: Rohm GmbH, Darmstadt, Germany

[21] Appl. No.: 686,034

[22] Filed: May 13, 1976

[30] Foreign Application Priority Data

June 25, 1975  Germany ............................ 2528201

[51] Int. Cl.² ............................. C08K 5/16; C08K 5/10
[52] U.S. Cl. ....................... 260/45.9 KB; 260/45.7 R; 260/45.7 S; 260/45.9 E; 526/1; 526/6; 526/89; 526/217
[58] Field of Search ............... 260/45.9 E, 45.9 KB, 260/45.7 S, 45.7 R, 32.4, 45.75; 526/491, 492, 341, 342, 217, 89, 6, 1; 264/211, 182

[56] References Cited

U.S. PATENT DOCUMENTS

| | | | |
|---|---|---|---|
| 2,745,814 | 5/1956 | Gilbert et al. | 260/32.4 |
| 2,878,223 | 3/1959 | Jenkins et al. | 260/45.7 R |
| 3,294,697 | 12/1966 | Le Fevre | 260/45.9 E |
| 3,923,950 | 12/1975 | Gump et al. | 260/45.9 |
| 3,991,153 | 11/1976 | Klausner et al. | 264/211 |

*Primary Examiner*—V. P. Hoke
*Attorney, Agent, or Firm*—Curtis, Morris & Stafford

[57] ABSTRACT

Compositions containing a polymer or copolymer of acrylonitrile stabilized against thermal discoloration by the presence, in the composition, of a nitroalkane, a nitrocycloalkane, an alkyl-, cycloalkyl-, or aryl-isocyanate, or of a pyrocarbonic acid dialkyl ester are disclosed together with methods for making such compositions.

25 Claims, No Drawings

COLOR STABILIZED ACRYLONITRILE POLYMERS

The present invention relates to color-stabilized acrylonitrile polymers and to methods of making the same.

Homopolymers and copolymers of acrylonitrile have a combination of strength and toughness which make them valuable in numerous industrial applications. However, these polymers have the disadvantage that on warming to temperatures of more than 80° C., particularly to temperatures more than 120° C., the polymers turn yellow or even brown. Temperatures of this magnitude are unavoidable in the preparation or the use of the polymers. Thus, numerous, but heretofore vain, attempts have already been made to avoid this thermal discoloration. A number of compounds have been found which suppress discoloration sufficiently that it is no longer highly conspicuous in fibers or thin films. However, in shaped bodies having wall thicknesses up to several centimeters, polymers prepared with the known additives still appear yellow to dark brown.

The cause of discoloration has been determined by the work of Kirby, Brandrup, et al. [Macromolecules, Vol, 1, No. 1, pp. 53 – 86 (1968)] as due to a polymerization of the nitrile groups to structures of the formula

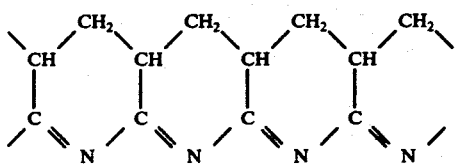

Such structures can be formed if acrylonitrile is present in a polymer in an amount, for example, of only 20 percent, since this monomer — because of its copolymerization behavior — have a tendency to form long connected sequences in a copolymer.

The series of reactions which precedes polymerization of the nitrile group has also been thoroughly researched. A key role in this sequence of reactions is played by an enolic structure of the formula

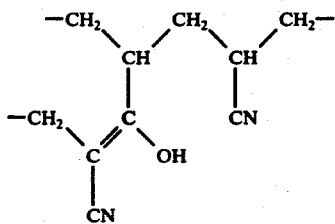

These enols initiate nitrile group polymerization. Various means by which structures of such a type could be formed are conceivable. Nevertheless, it has evidently heretofore not been able successfully to hinder the formation and further reactions of the enols.

The heat of the present invention is the recognition that a number of additives will suppress the discoloration of homopolymers and copolymers of acrylonitrile. The manner in which these compounds enter into the reactions which occur has not yet been explained.

According to the process of the present invention, polymers or copolymers of acrylonitrile can be protected against thermal discoloration by preparing a homogeneous mixture of:

A. polyacrylonitrile or a copolymer containing at least 20 percent by weight of acrylonitrile, the balance being other monomers copolymerizable with acrylonitrile; and B. at least one compound selected from the group consisting of alkyl-, cycloalkyl-, and aryl-isocyanates, pyrocarbonic acid dialkyl esters, and nitroalkanes and nitrocycloalkanes.

Preferred additives include nitroalkanes and nitrocycloalkanes of the formula $RNO_2$, wherein R is alkyl having 1 to 8 carbon atoms or cycloalkyl having 5 or 6 carbon atoms in the ring. Nitromethane and nitroethane are highly suitable, as are, also, 1-nitropropane, 1-nitrooctane, nitrocyclopentane, and nitrocyclohexane.

A second preferred class of additives are the isocyanates, including mono- and polyisocyanates such as diisocyanates and triisocyanates. Isocyanates of aliphatic hydrocarbons having up to 8 carbon atoms, such as isobutyl isocyanate, hexamethylene diisocyanate, and octyl isocyanate are mentioned as exemplary. Isocyanates of cyclic hydrocarbons having 5 or 6 carbon atoms in the ring are also suitable, including such materials as cyclohexyl isocyanate and 3-isocyanatomethyl-3,5,5-trimethyl-cyclohexylisocyanate (isophorone diisocyanate). Finally, aryl isocyanates having a total of 6 to 22 carbon atoms and comprising one or more fused or unfused phenyl rings, which may be substituted by — or joined by — lower aliphatic hydrocarbon groups having 1 to 4 carbon atoms, are also suitable. Exemplary materials include phenyl isocyanate, toluene diisocyanate, diphenylmethane-4,4'-diisocyanate, triphenylmethane-4,4',4"-triisocyanate, and naphthalene-1,5-diisocyanate.

A third preferred class of additives are pyrocarbonic acid dialkyl esters of the formula

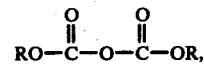

wherein R is alkyl suitably having from 1 to 8 carbon atoms.

Among these color-inhibiting additives, the pyrocarbonic acid dialkyl esters have a particularly high efficacy (as a rule, the commercially-available diethyl ester is employed), as do the nitroalkanes. The latter are particularly effective when employed in combination with other color-inhibitors, such as the pyrocarbonic acid esters.

The effect of the color-inhibiting additives of the invention can be increased still further by combining them with a thioether of the formula R—S—R', where R and R' are the same or different aliphatic groups each having 1 to 18 carbon atoms (and together having at least 4 carbon atoms). Carbon chains therein may be interrupted by oxygen or nitrogen atoms. Particularly preferred are aliphatic mono- and di-esters having 4 to 36 carbon atoms wherein a thioether group is present in either the acid or alcohol portion of the ester. Such materials include bis-(2-methoxycarbonylethyl)-sulfide, bis-(2-methoxycarbonylpropyl)-sulfide, and bis-(2-lauryloxy-carbonylethyl)-sulfide (=thio-bis-propionic acid-dilaurylester).

The thioether is commercially employed in an amount from 0.01 to 2 percent, by weight of polymer.

The color-stabilized polymers according to the present invention can be prepared by numerous different method embodiments, in all of which a homopolymer or copolymer of acrylonitrile is homogeneously combined with an effective amount of one or more of the aforementioned color-inhibiting compounds prior to being heated to a temperature at which, in the absence of these compounds, discoloration would occur. The discoloration reactions take place, as do almost all reactions in organic chemistry, at a rate which is, ultimately, temperature-dependent. Thus, it is sufficient that the homogeneous mixture according to the present invention is prepared before color-forming conditions have been operative for a period of time causing a disturbing discoloration. For example, a molten polymer containing acrylonitrile can be homogeneously mixed with a color-inhibiting additive without the appearance of any visible discoloration, providing there is strenuously thorough mixing, for example as in an extruder. Conditions which would lead to a premature decomposition of the additives must be avoided.

A "homogeneous" mixture, as the term is used in the present specification and claims, is obtained if there is at least an effective amount of the additive present in each portion of the polymer, even though there still may be concentration differences of the additive within the polymer. Whether homogeneity in the sense of the present invention is obtained in a particular case can be most simply and quickly determined by preparing a test sample, heating it, and testing it for disturbing discolorations.

It is probable that the compounds added as stabilizers react with intermediate products which are formed during polymerization and/or on heating of the polymer, which products, in the absence of the additives, would produce discolorations. It is not known to what degree the additives are consumed during polymerization or during possible heating of the polymer during further working up. Thus, it is possible that the additives can no longer be found in the finished polymer in the amount in which they were originally added to the monomer mixture. In these cases, the term "homogeneous mixture" of the additive with a polymer is to be understood to mean that the compound was present in every portion of the polymer or monomer mixture forming the same in an effective amount at the beginning of polymerization or before heating of the polymer.

The amount in which the various additives are effective depends on various factors and must be determined from case to case. The amount of acrylonitrile present in the polymer structure, the highest possible temperature to which the polymer is exposed, the length of exposure of the polymer to thermal influences, and the degree of discoloration permissible in practice are the most important of these factors. The aforementioned compounds differ in their efficacy and are, thus, used in different amounts under otherwise equal conditions. Taking these various known factors into account, the effective amount of additive used is generally between 0.05 and 5 percent, preferably from 0.1 to 2 percent, by weight of polymer. As a rule, this amount of additive can be exceeded without disadvantage. In case a plurality of compounds is used, their combined weight should lie in the aforementioned region. The individual components of such mixtures can bring about a visible effect in amounts of even 0.01 percent, or 100 parts per million.

There are no difficulties in incorporating the color-inhibiting additives into a polymer when the polymer is prepared by bulk polymerization. The additives are dissolved in acrylonitrile or in a monomer mixture including acrylonitrile, optionally even after partial polymerization, and the polymerization is then carried out in an otherwise known fashion. The additives can be incorporated in a similar manner during pearl polymerization in an aqueous phase. For a solution polymerization of acrylonitrile, for example in dimethyl formamide, the additives can, of course, be added to the monomer solution. Nevertheless, it must be ascertained that they are not separated from the polymer on further working up of the solution. This requirement must also be observed when using other polymerization techniques, for example precipitation polymerization or emulsion polymerization.

As monomers which may be copolymerized with acrylonitrile, in principle all unsaturated compounds which can be polymerized by a free radical mechanism can be employed. Styrene, α-methyl styrene, butadiene, isoprene, acrylic acid esters, methacrylic acid esters, and methacrylonitrile have the greatest technical significance. Vinyl esters, unsaturated ketones, vinyl alkyl ethers, vinyl chloride, and vinylidene chloride are also suitable comonomers. Further, cross-linking monomers such as divinyl benzene, divinyl sulfone, triallyl cyanurate, or glycol dimethacrylate can be used.

The amount of acrylonitrile present in such copolymers is at least 20 percent by weight of the copolymer. The invention is of particular significance for copolymers of acrylonitrile containing a smaller amount of methyl methacrylate. A copolymer comprising 70 percent by weight of acrylonitrile and 30 percent by weight of methyl methacrylate is typical.

Although the addition of the color-inhibiting additives to the monomers, followed by polymerization, is the preferred embodiment of the present invention, the mixing of the additives with a finished, but not yet discolored, polymer is also a successful alternative. For example, the additives can be added to a solution of the polymer and fibers or films of the polymer can be prepared from this solution in a known fashion.

If the polymer is in a finely-divided form, for example as a precipitation polymer powder or as a pearl polymer, the additive can be introduced into the polymer particles by diffusion. For this purpose, the polymer particles can be brought directly into contact with the additives of the invention, which are mostly liquids, or with vapors, solutions, or emulsions thereof. When solutions or emulsions are used, the carrier liquid should not be a solvent for the polymer. The time required for a homogeneous distribution of the additives in the polymer particles by diffusion can be several hours or days.

As has already been mentioned, it is also possible first to mix a finely-divided polymer with the additives mechanically and then to homogenize the mixture by a common liquefaction. An extrude having one or, preferably, several screws, is suitable for this purpose, for example. The necessary melt temperature depends on the softening temperature of the polymer and, as a rule, is between 180° C. and 220° C.

In the absence of the additives of the present invention, homopolymers or copolymers of acrylonitrile are formed as clear products which, in thicknesses of several millimeters to several centimeters, are yellowish to a strong yellow-brown. Even if this color, which is developed during polymerization to an 80 or 90 percent conversion (which is generally attained at temperatures under 80° C.), is still relatively weak, the discoloration deepens significantly if the polymerization mixture is warmed to 100° C. to 120° C for purposes of completing polymerization. The degree of discoloration at this stage can still be accepted as a practical matter is the polymer is fashioned into fibers or thin films. At greater thicknesses, i.e. from about one-half millimeter upwards, the discoloration is quite disturbing, and is particularly so if the polymer is heated to still higher temperatures, for example 150° to 180° C., for purposes of forming. According to the process of the invention, this discoloration is suppressed to a weak yellow tint (in layer thicknesses of 3 - 5 mm), and, in the most advantageous cases, is suppressed entirely to colorlessness.

The degree of color improvement is evident from a comparison of the discoloration factors samples of a copolymer comprising 70 percent of acrylonitrile and 30 percent of methyl methacrylate prepared with and without a color-inhibiting additive. In this case, the additive comprises 0.5 percent by weight of pyrocarbonic acid diethyl ester and 0.1 percent by weight of bis-(2-methoxy carbonyl ethyl) sulfide, which are added to the monomer mixture prior to polymerization. The yellowing factor, G, is determined according to the following formula from the transmission values for light of wave lengths 420, 560, and 620 nanometers, utilizing the transmission values for pure polymethyl methacrylate (PMMA) as a comparison standard:

$$G = \frac{(T_{420,A} - T_{420,B}) - (T_{620,A} - T_{620,B})}{T_{560,A}} \times 100,$$

where $T_{420,A}$ is the transmission value for PMMA at 420 nm (and analogously for $T_{560,A}$ and $T_{620,A}$) and $T_{420,B}$ is the transmission value for the test sample at 420 nm (and analogously for $T_{620,B}$).

The following values were determined for the yellowing factor, G, for a polymer, $G_{100}$, heated for 2 hours at 100° C. during preparation, and for a polymer, $G_{150}$, which is subsequently further heated for 30 minutes at 150° C.

TABLE

|  | $G_{100}$ (120 min. at 100° C.) | $G_{150}$ (120 min. at 100° C. and 30 min. at 150° C.) |
|---|---|---|
| Polymer without additive | 20.7 | 50.3 |
| Polymer with additive | 5.4 | 6.4 |

The invention is advantageously utilized in the preparation of polymers from which shaped bodies having wall thicknesses of at least 0.5 mm are made, i.e. in preparing bulk polymers and molding compounds. These are mostly copolymers in which the content of acrylonitrile is between 20 and 85 percent by weight, particularly between 50 and 85 percent by weight, and which are prepared by bulk or pearl polymerization. 15 - 80 percent, preferably 15 - 50 percent, by weight of the copolymer comprises styrene, α-methyl styrene, butadiene, and/or alkyl esters of acrylic acid or methacrylic acid, optionally in combination with at most minor amounts of further monomers.

If desired, an emulsion polymer containing acrylonitrile can first be prepared which, in a second stage, is then transformed by graft polymerization into a pearl-like product.

Shaped bodies prepared according to the present invention retain their slight coloration in use. On weathering (e.g. in a "Xeno" test apparatus), only a slight increase in the yellowing factor is determinable if a conventional UV-protective agent is added to the resin.

Even if the polymers containing the additives are repeatedly subjected to temperatures which would otherwise cause discoloration, or are heated to such temperatures a long time after their preparation, the stabilizing action remains effective and the products keep their characteristic slight color. Of course, the stabilizing effect of the additives according to the present invention is observed only at temperatures to which the products are normally exposed. If these temperatures are considerably exceeded, then discoloration is to be expected, if even in a decreased degree.

Other conventional additives such as dyes, pigments, stabilizers, plasticizers, and the like can be employed in the polymers in the usual fashion.

A better understanding of the present invention and of its many advantages will be had by referring to the following specific examples, given by way of illustration.

EXAMPLES 1 - 3

A mixture of 70 parts of acrylonitrile, 30 parts of methyl methacrylate, 0.3 part of ethylene glycol dimethacrylate, 0.5 part of pyrocarbonic acid dialkyl ester, and 0.2 part of dilauroyl peroxide was placed in a chamber formed between two glass plates having an elastic gasket therebetween. The mixture was then polymerized for 20 hours in a water bath at 45° C. Subsequently, the resin was hardened for an additional 2 hours at 100° C. The thickness of the polymerized sheet was 5 mm. Pieces, 10 × 10 cm in size, were cut from this sheet and the discoloration factor ($G_{100}$) was determined. Subsequently, samples were heated for 30 minutes at 150° C. and the yellowing factor ($G_{150}$) was again determined.

In an analogous fashion, other thermostabilizing agents were employed in place of the pyrocarbonic acid ester in Examples 2 and 3.

The results are reported in the following Table.

| Ex. No. | Thermostabilizing Additive | Amount (parts by weight in 100 parts of monomer) | Yellowing Factor | |
|---|---|---|---|---|
| | | | $G_{100}$ | $G_{150}$ |
| 1 | Pyrocarbonic acid-diethylester | 0.5 | 6.0 | 13.8 |
| 2 | Cyclohexylisocyanate | 0.2 | 6.8 | 14.4 |
| 3 | Nitromethane | 0.2 | 5.0 | 8.4 |
| Comparison | No additive | — | 20.7 | 50.3 |

EXAMPLE 4

A plate was prepared according to Example 1 from a mixture of 70 parts of acrylonitrile, 25 parts of methyl methacrylate, 5 parts of methyl acrylate, 0.5 part of 1,4-butane diol-dimethacrylate, 0.15 part of tert.-butyl perpivalate, 0.05 part of a UV-absorber commercially available under the tradename "Tinuvin P", 0.5 part of pyrocarbonic acid diethyl ester, and 0.1 part of bis-(2-methoxycarbonyl ethyl)-sulfide. The yellowing factors were measured. The value of $G_{100} = 5.4$ and the value of $G_{150} = 6.4$.

EXAMPLE 5

A mixture of 70 parts of acrylonitrile, 25 parts of methylmethacrylate, 5 parts of methylacrylate, 0.5 part of 1,4butanediol-dimethacrylate, 0.15 part of tert.-butyl pivalate, 0.05 part of a UV-absorber commercially available under the tradename "Tinuvin P", 0.4 part of pyrocarbonic acid diethyl ester, and 0.1 part of nitromethane were put into a chamber formed between two glass plates having a peripheral elastic sealing gasket (6 mm in diameter) therebetween and were then polymerized in a water bath for 20 hours at 45° C. Subsequently, the polymer was hardened for an additional 2 hours at 100° C. The thickness of the polymerized plate was 5 mm. Pieces 10 × 10 cm in size were cut out from this plate and a yellowing factor $G_{100}=3.3$ was determined. Subsequently, the pieces were heated for 30 minutes at 150° C. and a yellowing factor $G_{150}=4.7$ was found.

EXAMPLE 6

A polymerized sheet was prepared according to Example 1 from a mixture of 70 parts of acrylonitrile, 30 parts of methyl methacrylate, 0.3 part of ethylene glycol dimethacrylate, 0.3 part of pyrocarbonic acid dimethyl ester, 0.15 part of bis-(2-methoxy carbonyl ethyl)-sulfide, and 0.1 part of azo diisobutyric acid dinitrile. The plate so prepared corresponded in its color brightness to the plate of Example 4.

EXAMPLE 7

A polymer, prepared as in Example 6 with the exception that 0.6 part of pyrocarbonic acid-di-2-ethylhexyl ester replaced the 0.3 part of pyrocarbnic acid dimethyl ester, was similarly comparable in its color brightness with the plate of Example 4.

EXAMPLE 8

A mixture of 75 parts of acrylonitrile, 25 parts of methyl methacrylate, 0.2 part of ethylene glycol dimethacrylate, 0.1 part of nitromethane, and 0.2 part of dilauroyl peroxide were placed into a chamber formed between two glass plates having an intermediate elastic peripheral gasket and were heated in a water bath for 22 hours at 45° C. Subsequently, the polymer was hardened for an additional 2 hours at 100° C. The thickness of the sheet was 4 mm. In contrast to a polymer prepared without the nitromethane additive, the polymer of the Example had only a weak yellow coloration which, also, did not increase significantly on tempering the plate for 30 minutes at 150° C.

EXAMPLE 9

Proceeding as in Example 8, a mixture of 70 parts of acrylonitrile, 30 parts of methyl methacrylate, 0.4 parts of 1,4-butane diol dimethacrylate, 0.2 part of nitrocyclohexane, 0.05 part of thio-bis-propionic acid-dilauryl ester, and 0.2 part of tert.-butyl perpivalate were polymerized to form a sheet which had only a light yellow tint.

Similar results were obtained when using 1-nitrobutane, 1-nitropentane, or 1-nitrohexane in place of nitrocyclohexane.

EXAMPLE 10

A mixture of 70 parts of acrylonitrile, 30 parts of methyl methacrylate, 0.3 part of ethylene glycol dimethacrylate, 0.2 part of cyclohexylisocyanate, and 0.15 part of tert.-butyl perpivalate were put into a chamber formed between two glass plates having an intermediate elastic sealing gasket and were polymerized in a water bath for 20 hours at 45° C. Subsequently, the polymerization was completed by heating for 2 hours at 100° C. In comparison with a sheet prepared without the additive of the present invention, the sheet prepared according to this Example had an essentially brighter color which remained substantially unaltered also when the sheet was thermally stressed by heating for 30 minutes at 150° C.

EXAMPLE 11

A bright colored and thermostable polymer sheet was prepared according to Example 10 using, instead of 0.2 part of cyclohexyl isocyanate, a mixture of 0.4 part of isophorone diisocyanate and 0.1 part of bis-(2-methoxy carbonyl ethyl)-sulfide as the thermal stabilizer.

EXAMPLE 12

A mixture of 65 parts of acrylonitrile, 30 parts of methyl methacrylate, 5 parts of styrene, 0.3 part of divinyl benzene, 0.2 part of divinyl sulfone, 0.3 part of 2,4-toluene diisocyanate, and 0.2 part of dilauroyl peroxide were polymerized according to Example 10 to form a bright-colored and thermostable sheet. Equivalent results are obtained using hexamethylene diisocyanate instead of toluene diisocyanate.

EXAMPLE 13

A mixture of 50 parts of acrylonitrile, 50 parts of styrene, 0.4 part of pyrocarbnic acid dimethyl ester, 0.1 part of bis-(2-methoxy carbonyl ethyl)-sulfide, and 0.1 part of azobisisobutyronitrile were polymerized as in Example 1 between glass plates to form a sheet 5 mm thick.

The sheet was yellowish. On heating at 150° for a period of 30 minutes, the color increased somewhat. A comparison sheet not containing an additive according to the invention was clearly yellow at the conclusion of polymerization and, on heating at 150° for 30 minutes, became strongly yellow.

EXAMPLE 14

Example 13 was repeated with the difference that the content of acrylonitrile was reduced from 50 to 30 parts and the content of styrene was increased from 50 to 70 parts.

The plate prepared with the additive according to the invention was colorless and remained colorless even on heating to 150° C. for 30 minutes. In contrast, a plate containing no additive had a clear yellow tint which increased on heating.

EXAMPLE 15

A mixture of 50 parts of acrylonitrile, 50 parts of styrene, 0.4 part of nitromethane, and 0.1 part of azobisisobutyronitrile was polymerized according to Example 8 between glass plates to form a 5 mm thick sheet.

The sheet obtained was yellowish, and its coloration increased somewhat on heating at 150° C. over 30 minutes. A comparison plate prepared without the additive according to the present invention was clearly yellow after polymerization was concluded and, on heating to 150° C. for 30 minutes, became strongly yellow.

EXAMPLE 16

A mixture of 50 parts of acrylonitrile, 50 parts of styrene, 0.4 part of cyclohexyl isocyanate, and 0.1 part of azobisisobutyronitrile was polymerized according to Example 10 between two glass plates to form a sheet 5 mm thick.

The sheet was yellowish. On heating at 150° C. over 30 minutes, the color increased somewhat. A comparison plate prepared without the additive according to the present invention was clearly yellow after polymerization was concluded and, on heating at 150° C. for 30 minutes, became strongly yellow.

EXAMPLE 17

Thirty parts of a monomer mixture comprising 80 parts of acrylonitrile and 20 parts of methyl methacrylate were polymerized in 70 parts of dimethyl acetamide after the addition of 0.2 part of tert.-butyl perpivalate, at 45° C. The highly viscous polymer solution was combined with 1 part of pyrocarbonic acid diethyl ester and 2 parts of water. Whereas the polymer solution, without an additive, discolored to a brownish yellow at the boiling point for dimethyl acetamide even after 30 seconds, scarcely any discoloration was visible, even after 5 minutes, on boiling the polymer solution having the above additives.

EXAMPLE 18

Thirty parts of a monomer mixture comprising 80 parts of acrylonitrile and 20 parts of methyl methacrylate were polymerized at 45° C. in 70 parts dimethyl acetamide after the addition of 0.2 part of tert.-butyl perpivalate. The highly viscous polymer solution was combined with 1.8 parts of nitromethane and 0.18 part of dimethyl sulfone. Whereas the polymer solution, without an additive, discolored to a brownish yellow at the boiling point of diethylacetamide even after 30 seconds, scarcely any discoloration was visible on boiling of the polymer solution with the above-identified additives, even after 5 minutes.

EXAMPLE 19

Thirty parts of a monomer mixture comprising 80 parts of acrylonitrile and 20 parts of methyl methacrylate were polymerized at 45° C. in 70 parts of dimethyl acetamide after the addition of 0.2 part of tert.-butyl perpivalate.

The highly viscous polymer solution was combined with 0.7 part of cyclohexyl isocyanate and 0.2 part of bis-(2-methoxy carbonyl ethyl)-sulfide. Whereas the polymer solution without an additive discolored to a brownish yellow at the boiling point of dimethylacetamide even after 30 seconds, scarcely any discoloration was visible on boiling the polymer solution containing the above additives even after 5 minutes.

EXAMPLE 20

Five parts of a partially-hydrolyzed polyvinyl acetate (commercially available as "Mowiol N 70-80") was dissolved in 1000 parts of deionized water in a 2-liter round flask equipped with a paddle stirrer and a tube for introducing a protective atmosphere of $CO_2$, and then heated with stirring on a water bath to 75° C.

At this temperature, a monomer phase, comprising 350 parts of acrylonitrile;
150 parts of ethyl acrylate;
2.5 parts of azoisobutyronitrile; and
2.5 parts of nitromethane was added and dispersed in the water phase by the shearing forces of the stirrer. The polymerization was carried out for 110 minutes at 75° C., after which the mixture was post-heated for 60 minutes at 85° C.

After cooling, the polymer formed was collected on a filter, washed with deionized water, and dried.

The pearl polymer appeared pure white. In contrast thereto, a pearl polymer prepared without the addition of nitromethane had a clear yellowish tint. After 30 minutes heating at 150° C. in air, the pearl polymer containing the additive is yellowish, whereas the additive-free material has become brownish-yellow.

EXAMPLE 21

Five parts of a partially-hydrolyzed polyvinyl acetate, as in Example 20, was dissolved in 1000 parts of deionized water contained in a 2-liter round flask with a paddle stirrer and gas introduction tube and then heated on a water bath with stirring to 75° C.

At this temperature, a monomer phase comprising 350 parts of acryonitrile;
150 parts of ethyl acrylate;
2.5 parts of azoisobutyronitrile;
2.5 parts of isophorone diisocyanate; and
1.5 parts of bis-(2-methoxy carbon ethyl)-sulfide was added and dispersed in the water phase by the shearing forces of the stirrer. The mixture was polymerized for 110 minutes at 75° C. and then post-heated for 60 minutes at 85° C.

After cooling, the pearl polymer formed was collected on a filter, washed with deionized water, and dried.

The pearl polymer appeared pure white. In contrast, a pearl polymer prepared without the addition of isophorone diisocyanate had a clear yellowish tint. After 30 minutes heating at 150° C. in air, the pearl polymer containing the additive is yellowish, whereas the additive-free material has become brownish-yellow.

EXAMPLE 22

Five parts of a partially-hydrolyzed polyvinyl acetate, as in the previous Examples, are dissolved in 1000 parts of deionized water contained in a 2-liter round flask with a paddle stirrer and gas introduction tube and heated on a water bath with stirring to 75° C.

At this temperature, a monomer phase, comprising 350 parts of acrylonitrile;
150 parts of ethyl acrylate;
2.5 parts of azoisobutyronitrile;
5 parts of pyrocarbonic acid-di (2-ethylhexyl ester); and
1 part of nitropropane is added and dispersed in the water phase by the shearing forces of the stirrer. The mixture was polymerized for 110 minutes at 75° C. and then post-heated for 60 minutes at 85° C.

After cooling, the pearl polymer formed was collected on a filter, washed with deionized water, and dried.

The pearl polymer appeared pure white. In contrast, a pearl polymer prepared without the addition of pyrocarbonic acid ester and nitropropane had a clearly yellow tint. After 30 minutes heating at 150° in air, the pearl polymer containing the additive is yellowish, whereas the additive-free material has become brownish-yellow.

EXAMPLE 23

Thirty parts of a monomer mixture comprising 80 parts of acrylonitrile and 20 parts of methylmethacrylate were polymerized at 45° C. in 70 parts of dimethylacetamide after the addition of 0.2 part of tert.-butyl perpivalate.

A portion of the finished polymer solution was combined with 2 parts of nitromethane and 0.1 part of bis-(methoxycarbonylethyl)-sulfide. Whereas the polymer solution not containing an additive discolored to a brownish-yellow at the boiling point of dimethylacetamide after only 30 seconds, scarcely any discoloration was visible after boiling the polymer solution containing the above additive for 5 minutes.

What is claimed is:

1. A method of making a polymer composition stabilized against thermal discoloration, said composition comprising a homopolymer of acrylonitrile or a copolymer comprising at least 20 percent by weight of acrylonitrile, the balance being one or more monomers copolymerizable with acrylonitrile, which method comprises dissolving an effective amount of at least one stabilizer selected from the group consisting of nitroalkanes having 1 to 8 carbon atoms, nitrocycloalkanes having 5 or 6 carbon atoms in the cycloalkane ring, alkyl isocyanates having up to 8 carbon atoms, cycloalkyl isocyanates having 5 or 6 carbon atoms in the cycloalkyl ring, aryl isocyanates having 6 to 22 carbon atoms in the aryl group, and pyrocarbonic acid dialkyl esters wherein each alkyl group has from 1 to 8 carbon atoms, in monomeric acrylonitrile or in a monomer mixture comprising at least 20 percent by weight of acrylonitrile, which monomer or monomer mixture may be partially polymerized, and then polymerizing the resultant mixture in bulk to form said stabilized composition.

2. A method as in claim 1 wherein said resultant mixture is polymerized in bulk in a flat chamber formed between two glass panes having a peripheral sealing gasket therebetween.

3. A polymer composition prepared by the method of claim 1.

4. A polymer composition as in claim 3 wherein said stabilizer is present in said monomer or monomer mixture in an amount from 0.05 to 5 percent by weight thereof.

5. A polymer composition as in claim 3 wherein said stabilizer is present in said monomer or monomer mixture in an amount from 0.1 to 2 percent by weight thereof.

6. A method of making a polymer composition stabilized against thermal discoloration, said composition comprising a homopolymer of acrylonitrile or a copolymer comprising at least 20 percent by weight of acrylonitrile, the balance being one or more monomers copolymerizable with acrylonitrile, which method comprises dissolving an effective amount of at least one stabilizer selected from the group consisting of nitroalkanes having 1 to 8 carbon atoms, nitrocycloalkanes having 5 or 6 carbon atoms in the cycloalkane ring, alkyl isocyanates having up to 8 carbon atoms, cycloalkyl isocyanates having 5 or 6 carbon atoms in the cycloalkyl ring, aryl isocyanates having 6 to 22 carbon atoms in the aryl group, and pyrocarbonic acid dialkyl esters wherein each alkyl group has from 1 to 8 carbon atoms, in monomeric acrylonitrile or in a monomer mixture comprising at least 20 percent by weight of acrylonitrile, which monomer or monomer mixture may be partially polymerized, and then polymerizing the resultant mixture by pearl polymerization in an aqueous phase.

7. A polymer composition prepared by the method of claim 6.

8. A polymer composition as in claim 7 wherein said stabilizer is present in said monomer or monomer mixture in an amount from 0.05 to 5 percent by weight thereof.

9. A polymer composition as in claim 7 wherein said stabilizer is present in said monomer or monomer mixture in an amount from 0.1 to 2 percent by weight thereof.

10. A method of making a polymer composition stabilized against thermal discoloration, said composition comprising a homopolymer of acrylonitrile or a copolymer comprising at least 20 percent by weight of acrylonitrile, the balance being one or more monomers copolymerizable with acrylonitrile, which method comprises adding an effective amount of at least one stabilizer selected from the group consisting of nitroalkanes having 1 to 8 carbon atoms, nitrocycloalkanes having 5 or 6 carbon atoms in the cycoalkane ring, alkyl isocyanates having up to 8 carbon atoms, cycloalkyl isocyanates having 5 or 6 carbon atoms in the cycloalkyl ring, aryl isocyanates having 6 to 22 carbon atoms in the aryl group, and pyrocarbonic acid dialkyl esters wherein each alkyl group has from 1 to 8 carbon atoms, to a solution of said homopolymer or copolymer of acrylonitrile in an organic solvent therefor and then removing said solvent.

11. A polymer composition prepared by the method of claim 10.

12. A polymer composition as in claim 11 wherein said stabilizer is added in an amount from 0.05 to 5 percent by weight of said homopolymer or copolymer.

13. A polymer composition as in claim 11 wherein said stabilizer is added in an amount from 0.1 to 2 percent by weight of said homopolymer or copolymer.

14. A method of making a polymer composition stabilized against thermal discoloration, said composition comprising a homopolymer of acrylonitrile or a copolymer comprising at least 20 percent by weight of acrylonitrile, the balance being one or more monomers copolymerizable with acrylonitrile, which method comprises forming a homogeneous mixture of said homopolymer or copolymer with from 0.1 to 2 percent, by weight thereof, of at least one stabilizer selected from the group consisting of nitroalkanes having a 1 to 8 carbon atoms, nitrocycloalkanes having 5 or 6 carbon atoms in the cycloalkane ring, alkyl isocyanates having up to 8 carbon atoms, cycloalkyl isocyanates having 5 or 6 carbon atoms in the cycloalkyl ring, aryl isocyanates having 6 to 22 carbon atoms in the aryl group, and pyrocarbonic acid dialkyl esters wherein each alkyl group has from 1 to 8 carbon atoms.

15. A polymer composition prepared by the method of claim 14.

16. A polymer composition as in claim 15 which additionally comprises an aliphatic thioether.

17. A polymer composition as in claim 15 wherein said copolymer comprises from 20 to 85 percent by weight of acrylonitrile.

18. A polymer composition as in claim 15 wherein said copolymwer comprises from 50 to 85 percent by weight of acrylonitrile.

19. A polymer composition as in claim 15 wherein said copolymer comprises up to 80 percent by weight of at least one monomer selected from the group consisting of styrene, α-methyl styrene, butadiene, isoprene, vinyl esters, unsaturated ketones, vinyl alkyl esters, vinyl chloride, vinylidene chloride, methacrylonitrile, alkyl esters of acrylic acid, and alkyl esters of methacrylic acid.

20. A method as in claim 14 wherein said stabilizer is added to said homopolymer or copolymer while said homopolymer or copolymer is in finely divided form, the resulting mixture is melted, and the melt is mixed to distribute said stabilizer homogeneously throughout said homopolymer or copolymer.

21. A method as in claim 14 wherein said homopolymer or copolymer, in finely divided form, is contacted with a solution of said stabilizer until said stabilizer has diffused into said homopolymer or copolymer.

22. A method as in claim 14 wherein said homopolymer or copolymer, in finely divided form, is contacted with vapors of said stabilizer until said stabilizer has diffused into said homopolymer or copolymer.

23. A polymer composition prepared by the method of claim 20.

24. A polymer composition prepared by the method of claim 21.

25. A polymer composition prepared by the method of claim 22.

* * * * *